Oct. 5, 1948.  E. M. VELTEN  2,450,533
ADSORPTION APPARATUS
Filed Dec. 4, 1944  2 Sheets-Sheet 1
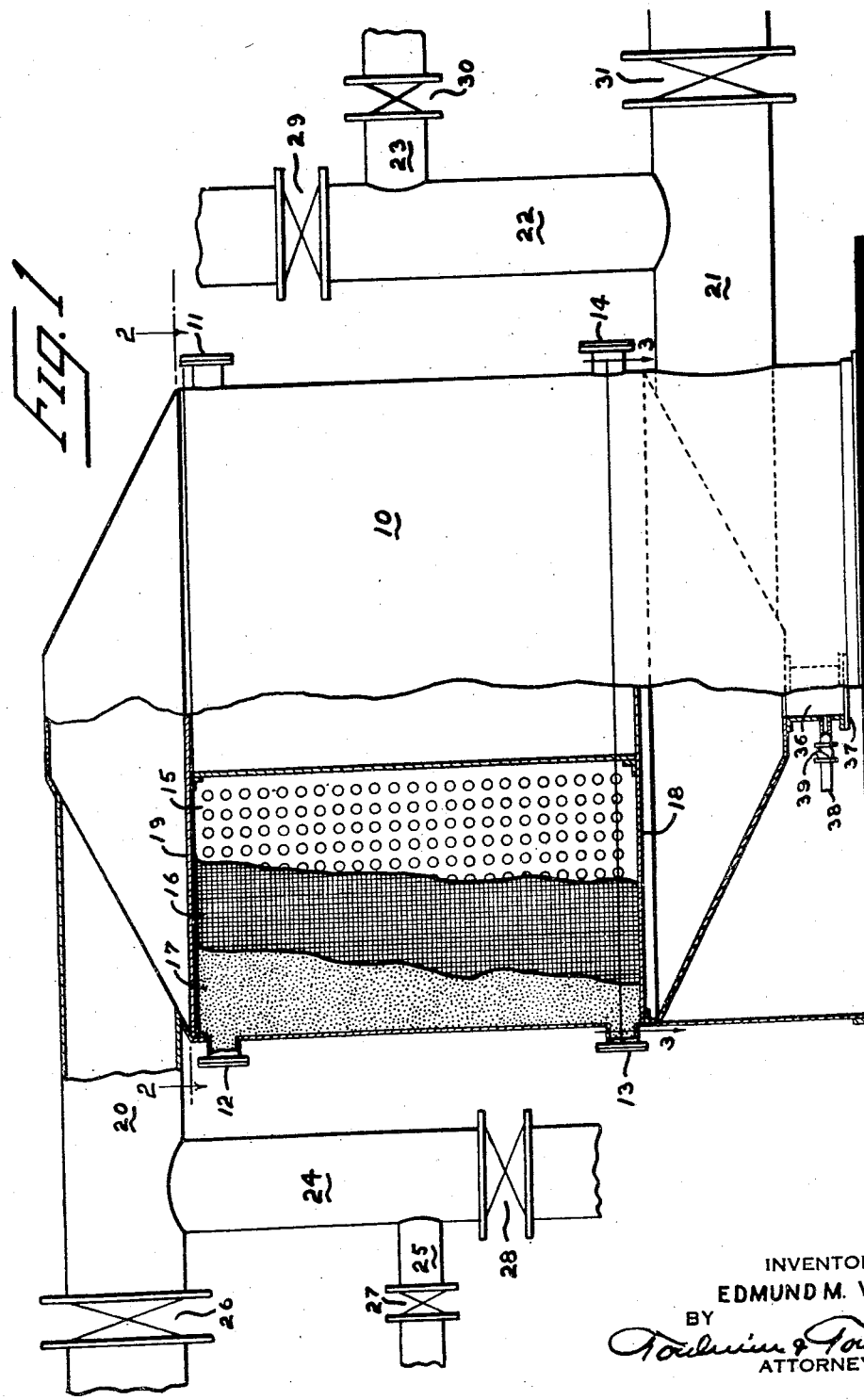
INVENTOR
EDMUND M. VELTEN
BY
ATTORNEYS Oct. 5, 1948.  E. M. VELTEN  2,450,533
ADSORPTION APPARATUS
Filed Dec. 4, 1944  2 Sheets-Sheet 2
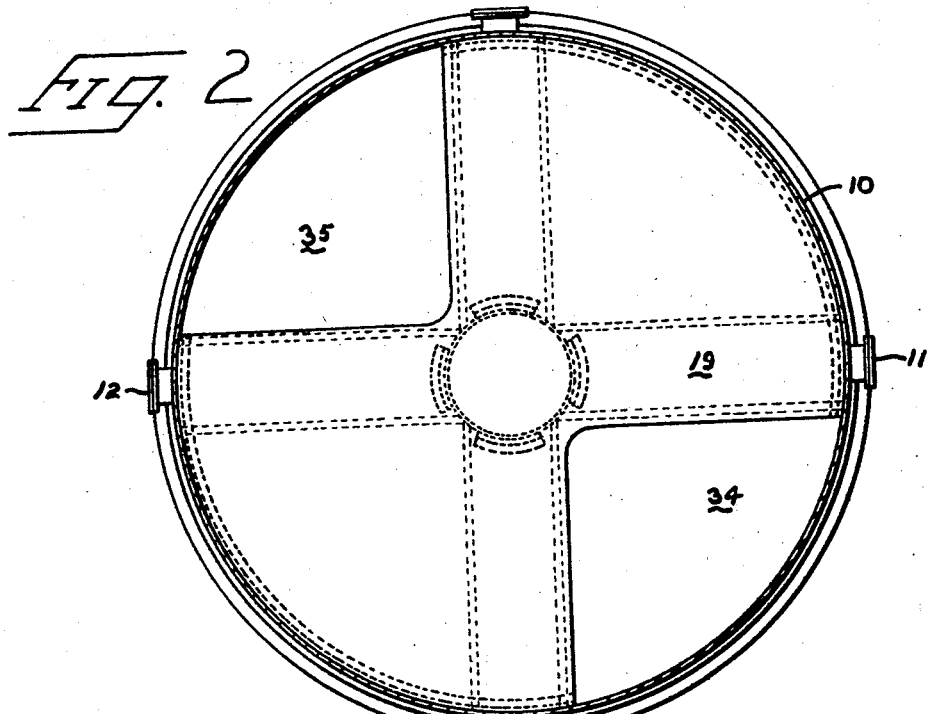
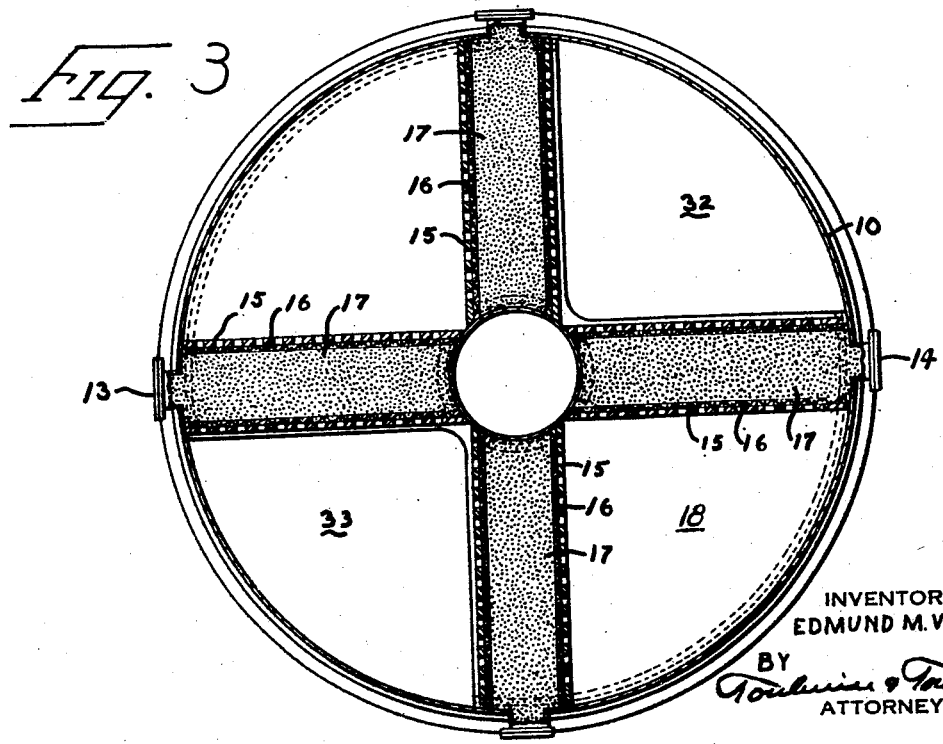
INVENTOR
EDMUND M. VELTEN
BY
ATTORNEYS Patented Oct. 5, 1948

2,450,533

UNITED STATES PATENT OFFICE 2,450,533

ADSORPTION APPARATUS

Edmund M. Velten, Dayton, Ohio, assignor to Chemical Developments Corporation, Dayton, Ohio, a corporation of Ohio Application December 4, 1944, Serial No. 566,625
In Canada August 7, 1943

2 Claims. (Cl. 183—4.3)

This invention relates to adsorption apparatus, and more particularly deals with an apparatus for separating and recovering fluids by adsorption.

Separation and recovery of fluids by adsorption are shown in various forms in the prior art. The most common type of adsorber structure consists of a container usually of metal provided with a horizontally disposed layer or bed of solid adsorbent through which fluid mixtures to be treated are caused to pass when introduced into the adsorber. The adsorbed substances are removed or extracted from the adsorbent by periodically heating the adsorbent as by the application of steam or of hot air. The type of fluid employed in desorbing the adsorbent is governed to a great extent by the nature of the adsorbent. As an example, steam is invariably used when the adsorbent is active or activated carbon, while hot air is used when the adsorbent is silica gel, activated alumina, or other similar adsorbents.

In the recovery of solvents from air very large volumes of the mixture must be treated, and this requires provision for contacting the solvent air mixture with large bed areas of adsorbent material. The same limiting conditions exist in the dehumidification of air as with silica gel or activated alumina.

With prior structures this has necessitated apparatus of excessive and uneconomical size and the employment of a plurality of adsorber units. The primary object of the present invention is to provide an adsorber the design and structure of which make it possible to handle large volumes of air or other gases laden with adsorbable substances in a limited number of adsorption units of reasonable size.

The adsorption apparatus of the present invention essentially consists of a cylindrical shell or vessel containing four rectangular beds of adsorbent radially disposed at angles of 90°. The four beds divide the interior of the adsorber into quadrants. The adsorber is preferably installed in vertical position, although it may be installed horizontally if so desired. Irrespective of the position in which it is installed, it is capable of handling a greater volume of air or other gases per unit of volume than any other type of adsorber hitherto used, and it therefore offers distinct advantages over adsorption apparatus of the prior art.

The nature of the present invention will be more readily understood from the following description taken in connection with the annexed drawings, in which:

Fig. 1 is an elevational view, partly in section, of the adsorber of the present invention;

Fig. 2 is a sectional view taken along the line 2—2 of Fig. 1; and

Fig. 3 is a sectional view taken along the line 3—3 of Fig. 1.

Referring to Fig. 1, 10 is the shell or casing of the adsorber, 11 and 12 are manholes for charging the beds, and 13 and 14 are manholes for emptying the beds. The beds consist of an outer perforated plate 15 faced on the inside with a wire mesh screen 16 against which the adsorbent 17 is held. The beds are held on the bottom side on a solid plate 18 and are covered on the upper side by a solid plate 19. The adsorber is provided with a plurality of inlet and outlet connections 20, 21, 22, 23, 24 and 25 and with valves 26, 27, 28, 29, 30 and 31.

Assuming, for example, that it is desired to extract acetone from air, the acetone-air mixture is admitted through valve 31 (see Fig. 1) and duct 21 into the bottom portion of the adsorber 10. The bottom of the adsorber is provided with a distributing plate 18 which permits the flow of the acetone-air mixture through two diametrically opposite quadrants 32 and 33 (see Fig. 3) which communicate with the four beds within the adsorber. The acetone-air mixture then passes from the quadrants 32 and 33 through the beds which border them and having done so, the residual air (the acetone having been removed by the adsorbent) leaves the body of the adsorber through quadrants 34 and 35 (see Fig. 2) and thence through conduit 20 and valve 26.

After the adsorber has been in operation for time sufficient to permit the adsorbent to adsorb its maximum effective or practical capacity, the flow of acetone-air mixture is by-passed to another unit of similar design (not shown) and the unit previously in service is the regenerated for future use.

To this end, steam is introduced through valve 27 (see Fig. 1), conduit 25, conduit 24 and conduit 20 and passes from the top portion of the adsorber into the quadrants 34 and 35 and thence through the four beds of adsorbent. The steam passing through the beds of adsorbent removes therefrom the acetone vapors which the adsorbent has removed from the acetone-air mixture, and the distillate, consisting of a mixture of acetone vapors and steam, passes from the beds through quadrants 32 and 33 and the bottom portion of the adsorber and exits through conduit 21, conduit 22, conduit 23 and valve 30 and is thereafter condensed and the acetone separated by distillation or otherwise.

After this steaming cycle the beds of adsorbent in the adsorber are dried and/or cooled (if so desired) by admitting air through valve 29, conduit 22 and conduit 21 into the bottom portion of the adsorber from which it will enter the four beds through quadrants 32 and 33. The air will leave through quadrants 34 and 35, the top portion of the adsorber and conduits 20 and 24 and valve 28.

It will be understood, of course, that where it is desirable or advantageous to dry the adsorbent in the beds, the air introduced into the adsorber 10 through valve 29 and conduits 22 and 21 is preheated so that it may carry sufficient heat to evaporate the moisture in the adsorbent. When warm air has been used for drying the adsorbent subsequent to a steaming operation, cool air should be introduced thereafter through valves 29 and conduits 22 and 21 in order that the temperature of the beds of adsorbent be lowered to a point sufficient to insure proper adsorption efficiency. In some cases it is possible to operate without necessarily drying the adsorbent, and in such cases the beds of adsorbent may be cooled down by merely introducing cool air (such as room air) through valve 29 and conduits 22 and 21. Process air may also be used for this purpose if it is not intended to be reintroduced into living or working quarters.

The structure of the adsorber of the present invention is such that the quantity of adsorbent held by it is substantially twice greater than would be the case in an adsorber of substantially the same dimensions but of conventional design. In like manner, an adsorber having the structure herein described and illustrated in the annexed drawings will adsorb substantially twice more adsorbable substance than would an adsorber of substantially the same size but of conventional design.

It will thus be obvious that the adsorber which is the subject matter of the present invention brings about economies in initial cost of equipment per pound of adsorbent installed and in operating cost which, in turn, result in lower costs of recovery. Therefore, the apparatus of the present invention lends itself well to the recovery of the cheaper types of solvents such as petroleum hydrocarbons. However, it will be clearly understood and obvious to those skilled in the art that the adsorber of the present invention may be utilized for the recovery or adsorption of every type of substance susceptible to adsorption.

For the purpose of illustration the apparatus of the present invention has been described in connection with the recovery of acetone from an acetone-air mixture, but it will be understood, of course, that it is not intended to limit the scope of the present invention to that particular application. The apparatus of the present invention may be used for the recovery of any other adsorbable material.

Since in the above description I have referred to desorption of the adsorbent by the application of steam and to the recovery of acetone from air, it will be obvious to those skilled in the art that the adsorbent used in this typical example must have been activated carbon.

Assuming, however, that it is desired to use the apparatus of the present invention for removing moisture from air or from a gas such as carbon monoxide, using silica gel or activated alumina as the adsorbent, the moist air or gas would be introduced into the adsorber through valve 31 and conduit 21 and would leave the adsorber through conduit 20 and valve 26. At the completion of the adsorption cycle warm air would be introduced into the adsorber through valve 28 and conduits 24 and 20 to remove the moisture held by the adsorbent and it would be permitted to leave the adsorber through conduits 21 and 22 and valve 28. The adsorbent in the beds would be cooled down after regeneration by substituting cool air (such as room air) for the hot air previously passed therethrough. No steaming cycle would be required in such an instance.

Referring again to Fig. 1, it will be noted that the bottom cone portion of the adsorber is provided with a trap 36 adapted to collect the drainings or condensation within the adsorber. Any dust or dirt which accumulates within the adsorber will be washed down into this trap and may be removed therefrom as mud or scum by removing the plate 37. A drain pipe 38 provided with a check valve 39 is connected to the trap. This drain pipe serves to remove condensate from the trap as it accumulates to the level of the pipe to a central sump or receiving tank. The check valve 39 permits outward flow from the trap and prevents inward flow thereto and proves useful when a battery of adsorbers is connected to a common header. However, a hydraulic leg or gooseneck of sufficient height to equalize the maximum pressure within the adsorber may be used with equal satisfaction in place of the check valve.

While I have illustrated the beds as comprising an outer perforated plate faced on the inner side with a wire mesh screen and prefer to use such a construction, it will be understood by those skilled in the art that a foraminous plate having perforations of sufficiently small diameter to prevent outflow of adsorbent would prove equally satisfactory and that no wire mesh screen would need to be used in such case. It will be understood likewise that the beds could be constructed of wire mesh screen using wire of sufficient diameter to provide structural strength and that in such case the foraminous outer plate would not be necessary. The use of the foraminous plate lined with wire mesh screen nevertheless represents a highly satisfactory and preferred construction.

I am not limited or restricted to the use of four beds in the apparatus of my invention and any greater even number of beds may be employed. However, I prefer to make use of four beds and not in excess of six beds in view of the fact that a greater number of beds leads to a complicated internal structure which is costly.

It will be understood that while I have described and illustrated certain specific embodiments of my invention, I do not intend to have my invention limited to or circumscribed by the specific details of construction, arrangement of parts, structure, proportions and procedures herein described or illustrated in the annexed drawings in view of the fact that the apparatus of my invention is susceptible to modifications depending on individual conditions and preference without departing from the spirit of this disclosure and the scope of the appended claims.

I claim:

1. An adsorber comprising a cylindrical body or casing, a closed cylindrical member concentrically arranged in said casing, four equidistantly spaced beds radially disposed from said cylindrical member to said casing, a distributing plate forming the bottom support for said beds, said plate having two diametrically opposite apertures permitting flow of fluid therethrough, a distributing plate resting adjacent the top portion of said beds having diametrically opposite apertures thereon for the flow of fluids therethrough and closing the top of said first-mentioned apertures.

2. In an adsorber a cylindrical body or casing, a closed cylindrical member of relatively smaller diameter concentrically disposed within said casing, four equidistantly spaced beds extending radially from the outer periphery of said cylindrical member of smaller diameter to the inner periphery of said casing, a distributing plate forming the bottom support for said beds, said plate having two diametrically opposite apertures permitting flow of fluids therethrough, a distributing plate resting adjacent the top portion of said beds, said plate having two diametrically opposite apertures thereon for the flow of fluids therethrough, inlet and outlet connections on opposite ends of said adsorber adapted to cooperate with said distributing plates for the flow of fluids through said beds, the apertures in said first mentioned distributing plate and the apertures in said second mentioned distributing plate being contraposed, whereby fluids passing through the apertures of one of said distributing plates are caused to flow through said beds before passing through the apertures of the other distributing plate.

EDMUND M. VELTEN.

REFERENCES CITED

The following references are of record in the file of this patent:

UNITED STATES PATENTS

| Number | Name | Date |
|---|---|---|
| 519,275 | Sellenscheidt | May 1, 1894 |
| 1,098,506 | Kelm | June 2, 1914 |
| 1,429,856 | Etter | Sept. 19, 1922 |
| 1,737,822 | Barnebey | Dec. 3, 1929 |
| 2,053,159 | Miller | Sept. 1, 1936 |
| 2,111,906 | Stewart | Mar. 22, 1938 |
| 2,174,666 | Logan | Oct. 3, 1939 |